UNITED STATES PATENT OFFICE.

CARLETON ELLIS, OF MONTCLAIR, NEW JERSEY.

CATALYTIC BODY AND METHOD OF MAKING THE SAME.

1,167,280. Specification of Letters Patent. Patented Jan. 4, 1916.

No Drawing. Application filed August 9, 1912. Serial No. 714,155.

*To all whom it may concern:*

Be it known that I, CARLETON ELLIS, a citizen of the United States, residing at Montclair, in the State of New Jersey, have invented new and useful Improvements in Catalytic Bodies and Methods of Making the Same, of which the following is a specification.

This invention relates to catalyzer adapted for synthetic operations such as the production of ammonia by combination of the elements of the latter and relates particularly to a catalyst consisting of or containing a strongly basic metal or material containing bodies of a character capable of readily occluding one or more of the reacting elements such for example as nitrogen in the case of cerium metal and which catalytic agent is preferably supported on a carrier, preferably of a more or less porous character which preferably may be of material adapted to absorb one or more of the gaseous elements so as to aid in the reaction.

In producing a catalyzer, which may be employed for the production of ammonia from its elements, I preferably use a base, which may consist of a hydrogen occluding agent, such as charcoal, particularly of the kind hereinafter referred to, said material being associated with a nitrogen occluding metal, such as the metal cerium. For use as a catalyzer, it is not necessary that the metal cerium, be absolutely pure. In fact it is desirable that small amounts of one or more of such other metals as lanthanum, didymium, yttrium and certain others be present, as these have a considerable energizing effect upon the cerium, so that cerium containing such other metals is greatly superior to the pure metal, as a catalyzer for the catalytic production of ammonia.

For the preparation of a suitable catalyst, I preferably proceed in the following manner. Cerium oxid, which is at present a waste product of the mantle industry, and which contains usually a sufficiently large amount of the rare metals above referred to, is first washed to remove soluble salts of alkalis, etc., and may be treated in any desired manner to remove impurities which act as contact poisons, or substances which cause a lowering of the catalytic activity, and it is thereafter reduced to metal.

As stated above, cerium oxid often contains small percentages of lanthanum, didymium, yttrium, and certain other substances which greatly enhance the catalytic activity of the cerium, when present in small amounts, but if the amount of these is too small, or if these are absent, further amounts of any or all of these metals, or reducible compounds thereof may be added to the metallic cerium, or to the oxid used. Cerium, containing such small amounts of the other rare metals, is preferably converted into a contact mass in the following manner. Granular cocoanut charcoal is first washed or extracted with dilute acids, *e. g.* by boiling with hydrochloric acid of moderate strength, to remove soluble matter, such as alkali and alkaline earth metal salts, and is thereafter washed well with water and dried, and heated in an inert atmosphere to about a red heat, after which hydrogen is passed thereover, at a temperature of from 300° C. up to a red heat, and thereafter molten cerium (prepared in the above manner) is atomized by means of a jet of hydrogen gas under pressure, upon the granular charcoal, which may be contained in a rotating drum, in order to give granular charcoal which is lightly and more or less uniformly coated, and somewhat impregnated, with finely divided metallic cerium, containing the above mentioned rare metals, which material will constitute a catalyzer suitable for the production of ammonia set forth in an illustrative sense herein, but it should be understood that I do not limit myself to the precise materials described or to the manner of mixing specifically set forth herein, but that various modifications in composition or procedure of incorporating may be made without departing from the spirit of the present invention.

While I have described my process in great detail, I do not limit myself to these exact details, but only to the scope of the following claims.

What I claim is:—

1. A process of making a catalytic mass which comprises physically uniting granular carbonaceous material with finely divided cerium.

2. A process of making a catalytic mass, which comprises treating granular charcoal with a solvent for alkali metal compounds and alkaline earth metal compounds, thereafter drying and physically uniting with a finely divided free metal capable of serving as a catalyzer.

3. A process of making a catalytic mass, which comprises physically uniting granular charcoal and a molten metal.

4. A process of making a catalytic mass, which comprises atomizing molten catalytic material into contact with a granular carrier.

5. A process of making a catalytic mass, which comprises atomizing molten cerium, containing activating agents, into contact with granular purified charcoal.

6. A process of making a catalytic body, which comprises distributing a catalytic material in a molten condition into contact with a granular carrier.

7. A process of making a catalytic body, which comprises distributing molten cerium into contact with a granular carrier.

8. A process of making a catalytic body, which comprises distributing molten cerium containing small percentages of lanthanum, didymium, and yttrium into contact with a granular carrier.

9. A process of making a catalytic body, which comprises distributing a catalytic material in a molten condition into contact with granular cocoanut charcoal.

10. In the preparation of a catalytic body, the step of preparing granular charcoal, which comprises treatment with an acid, treatment with water, drying, and treatment with hydrogen.

11. In the preparation of a catalytic body, the step of preparing granular charcoal, which comprises treatment with moderately concentrated hydrochloric acid, treatment with water, drying, and treatment with hydrogen.

12. In the preparation of a catalytic body, the step of preparing granular charcoal, which comprises treatment with an acid, treatment with water, drying, and treatment with hydrogen at a temperature of from 300° C. to a red heat.

13. A process of making a catalytic body which comprises treating granular charcoal with an acid, thereafter treating the same with water, drying, and thereafter treating the same with hydrogen and with atomized molten catalytic metal.

14. In the preparation of a catalytic body, the step of preparing granular charcoal, which comprises treatment with liquid purifying agents, drying, and treatment with hydrogen.

15. In the preparation of a catalytic body, the step of preparing granular charcoal, which comprises treatment with solvents of alkali metal compounds and alkali earth metal compounds, drying, and treatment with hydrogen.

16. A catalytic body comprising a granular base carrying finely divided catalytic material including a rare earth element.

17. A catalytic body comprising purified granular charcoal carrying finely divided catalytic material capable of readily combining with nitrogen.

18. A catalytic body comprising a granular base carrying finely divided cerium.

19. A catalytic body comprising a granular base carrying finely divided cerium containing activating agents.

20. A catalytic body comprising a granular base carrying finely divided catalytic metal, the latter containing associated therewith an activating agent.

21. The process of making a catalyzer adapted to combine hydrogen and nitrogen which comprises incorporating an easily oxidizable nitrogen occluding agent in a molten state with a hydrogen occluding agent in a substantially non-oxidizing atmosphere.

22. The process of making a catalyzer adapted to combine hydrogen and nitrogen which comprises incorporating a nitrogen occluding agent with a hydrogen occluding agent in an atmosphere free from oxygen.

23. The process of making a catalyzer adapted as a hydrogen carrier which comprises incorporating a nitrogen occluding agent with a hydrogen occluding agent in an atmosphere of hydrogen.

24. A catalyzer comprising porous material comprising a hydrogen occluding agent and a nitrogen occluding agent in contact therewith.

25. As a catalytic, a base carrying associated therewith, a finely divided metal catalyst, containing a catalytic metal of the cerium group, closely adhering thereto.

26. As a catalytic, a corbonaceous base associated with a catalytic metal of the cerium group.

27. As a catalytic, a base associated with finely divided catalytic metal comprising cerium and activating agents.

28. As a catalytic, a base associated with finely divided catalytic metal comprising metallic cerium, containing at least one of the metals lanthanum, didymium and yttrium.

29. A method of making a catalyst which comprises depositing a calatytic metal of the cerium group, upon a carbonaceous base.

30. A method of producing a catalyst which comprises atomizing a molten catalytic metal having the property of readily uniting with nitrogen, into contact with a bulky carrier.

31. A method of producing a catalyst which comprises atomizing molten cerium into contact with a carbonaceous base.

32. A catalyst comprising a carbonaceous base, and a catalytic material containing metallic cerium closely adhering thereto.

33. As a catalyst, a body containing free carbon and free cerium.

34. A method of producing a catalyst which comprises coating a carbonaceous base with a fluid material containing metallic cerium, and allowing said material to solidify.

35. A catalyst comprising a carbonaceous base, carrying a metallic nitrogen occluding agent.

36. A catalyst comprising a base, substantially free from contact poison, carrying a catalytic metal of the cerium group.

Signed at Montclair, N. J. this 6th day of August, 1912.

CARLETON ELLIS.

Witnesses:
F. Carbutt,
B. M. Ellis.